J. W. HAMM.
MOTOR VEHICLE.
APPLICATION FILED APR. 1, 1911.

1,076,033.

Patented Oct. 21, 1913.

2 SHEETS—SHEET 1.

Witnesses
G. M. Spring
S. White

Inventor
John W. Hamm,
Richard S. Owen
his Attorney

J. W. HAMM.
MOTOR VEHICLE.
APPLICATION FILED APR. 1, 1911.
1,076,033.
Patented Oct. 21, 1913.
2 SHEETS—SHEET 2.
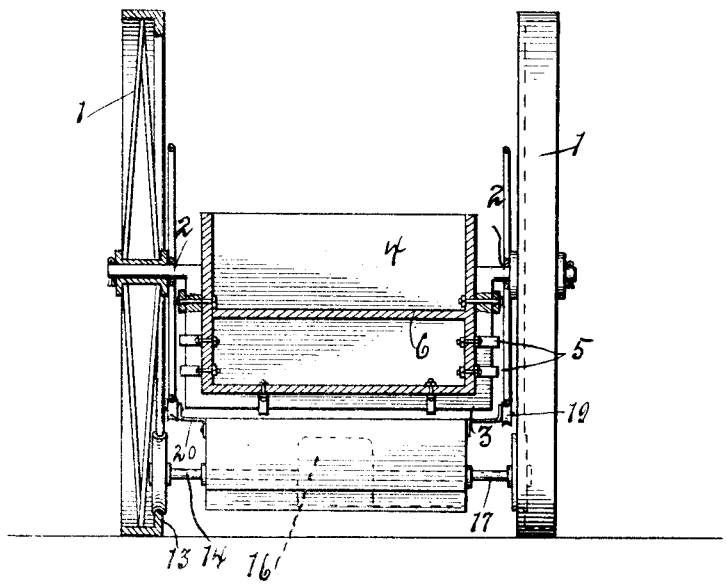
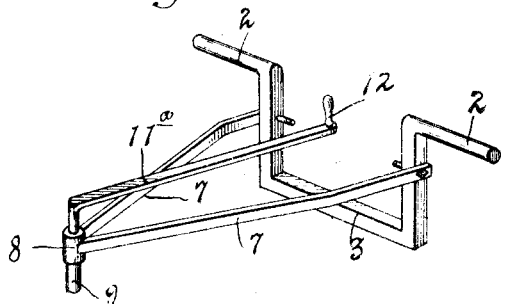
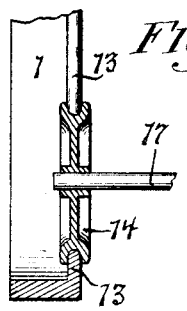
Witnesses
G. M. Spring
S. White
Inventor
John W. Hamm,
by Richard Glover
his Attorney

UNITED STATES PATENT OFFICE.

JOHN W. HAMM, OF HIGGINSVILLE, MISSOURI.

MOTOR-VEHICLE.

1,076,033.      Specification of Letters Patent.      Patented Oct. 21, 1913.

Application filed April 1, 1911. Serial No. 618,402.

*To all whom it may concern:*

Be it known that I, JOHN W. HAMM, a citizen of the United States, residing at Higginsville, in the county of Lafayette and State of Missouri, have invented new and useful Improvements in Motor-Vehicles, of which the following is a specification.

My invention relates to vehicles and more particularly to a motor-vehicle of a new and novel type.

An object of my invention is to produce a motor-vehicle in which a comparatively heavy movable body is carried, the position of which body while the vehicle is running aids the movement of the vehicle and in fact produces a large portion of the power which drives said vehicle, this result being obtained by the movement of the center of gravity of said body beyond the vertical diameter of the traction wheels of the vehicle whereby said wheels are rotated.

Another object of my invention is to produce a motor-vehicle which shall be safer and speedier than those now in use, and which because of its novel construction does not require a motor of such high horse power to drive it as a motor-vehicle of the type now in use.

With the foregoing and other objects in view, my invention consists in such detail of construction and in the arrangement and combination of parts as will be hereinafter more fully described and specifically pointed out in the appended claim.

In describing my invention in detail, reference will be had to the accompanying drawings wherein like characters denote like or corresponding parts throughout the several views, and in which—

Figure 1:
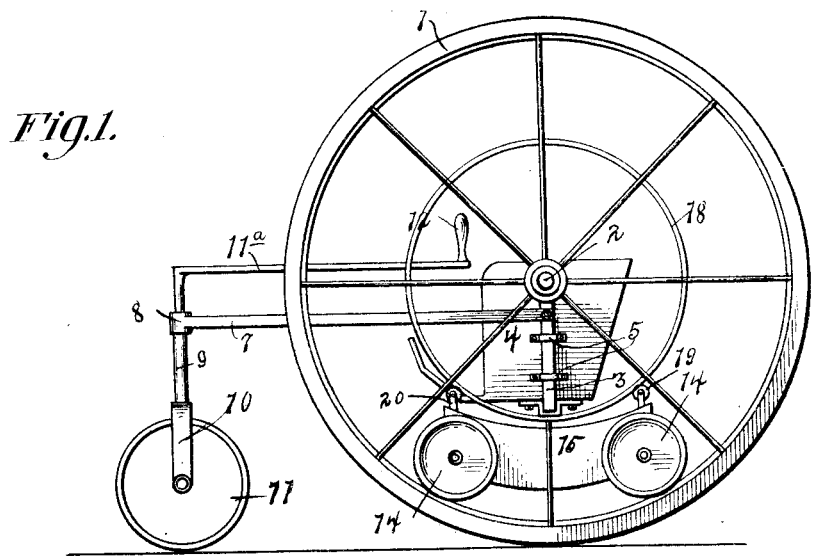
Figure 2:
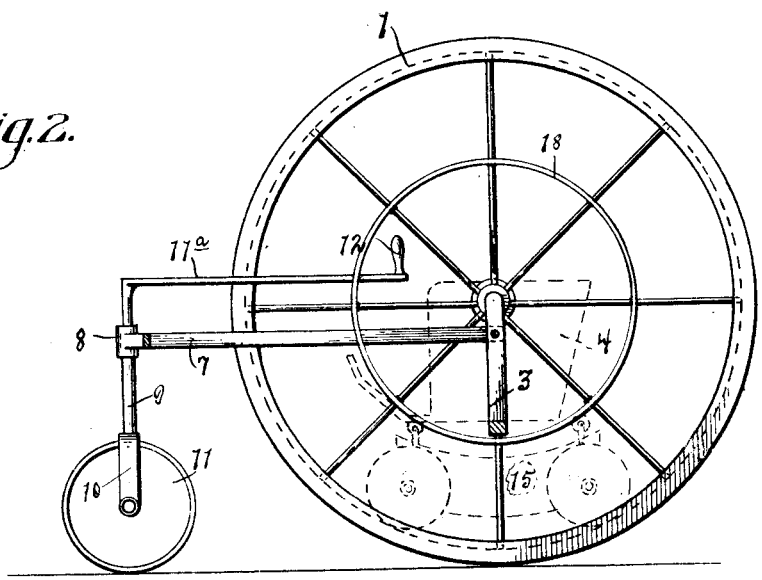

Figure 1 is a view of my improved vehicle in side elevation. Fig. 2 is a longitudinal sectional view of the same the seat and driving car being shown in dotted lines. Fig. 3 is a vertical cross section of my improved vehicle. Fig. 4 is a perspective view of the axle and seat supporting device, and Fig. 5 is a detailed sectional view showing the method of engagement between the driving car and traction wheels of the vehicle.

In reducing my invention to practice, I employ two wheels of large size such as those designated by the numeral 1 in the drawings. These wheels are mounted upon axles 2 which extend outwardly from an angularly bent supporting member 3 which supporting member carries the body or passenger carrying portion of my vehicle 4. This body is connected to the drop frame or supporting member 3 by any suitable means, I showing clamps or braces 5 in the drawings. From the foregoing it will be seen that the wheels 1 are relatively speaking of large size inasmuch as the axles 2 come above the seat of the body.

Extending out in front of the body 4 are two converging arms 7 which carry at their forward ends a journaled bearing 8 in which is mounted a shaft 9 which in turn carries forks 10 at its lower end, said forks being adapted to receive a steering arm 11ª as shown.

Extending from the top of the shaft 9 and fixed thereto is a steering arm 11ª said arm terminating immediately in front of the driver's seat in a handle 12 of suitable form. It will of course be understood that this steering mechanism may be disposed either in front of the vehicle as shown, or in rear thereof as may be desired and any other means than the arm 11ª and handle 12 may be employed to turn the wheel 1 in the desired direction.

The wheels 1 are each provided with an inwardly turned flange 13 which form tracks upon which run wheels 14, which are mounted upon the driving carriage 15 said driving carriage being thus carried by said tracks in a position normally below the passenger body 4. A motor 16 of any desired type is contained in the driving car and connected to one or more of the axles 17 upon which are carried the grooved wheels 14. Suitable means may be provided whereby said motor may be controlled from the seat 6, no such means having been shown in the drawings as this forms no part of my present invention.

Any suitable means may be provided to prevent the motor carriage from leaving the tracks upon which it runs. In the drawings I show one means by which this result may be accomplished. This comprises circular guides 18 which are carried by the axles 2, said guides running in grooved pulleys 19 which are carried by brackets 20 mounted upon the motor carriage 15. I do not desire to be limited to this specific form of guiding means it being illustrated merely for convenience. Any other suitable means accomplishing the same result may be employed.

It will be seen that when the motor 16 is started the wheels of the driving car 15 are revolved and said car starts forward and tends to run around the large wheels 1. However the weight of said driving car and the curve of the large wheels prevents it from moving very far which of course results in the motion of the traction wheels 1 thereby moving the vehicle forward. Not only is this the case, but as the small car moves end upward on the rims of the large wheels gravity tends to pull the car downward this also tending to revolve said traction wheels. In view of this the driving car can be equipped with a motor of comparatively small horse power but the peculiar construction would result in great speed being attained by my improved vehicle. Means may also be provided whereby the motion of the motor may be reversed, the driving car thus acting as a brake and tending to stop the vehicle or to reverse its movement.

The foregoing describes only the principles of my invention, and I make no claim as to details which may be later perfected or worked out as occasion desires and conditions warrant. In view of this I desire it to be understood that slight changes in the construction and in the arrangement and combination of the various parts may be resorted to without departing from the spirit of my invention provided such changes fall within the scope of the appended claim.

Having thus fully described my invention, what I claim as new and desire to secure by Letters Patent, is:—

A vehicle comprising an axle having a downwardly disposed offset central portion, traction wheels mounted upon the ends of the shaft and having inwardly directed flanges, guide rings carried by the spokes of the wheel, a housing beneath the central portion of the axle and having a pair of spaced shafts extending transversely therethrough, wheels journaled on the ends of the shafts and engaged with the flanges of the traction wheels, guide wheels carried by the housing and engaged with the outer faces of the rings, means for driving the pair of shafts, a seat mounted in the downwardly disposed offset central portion of the axle, a front steering wheel, means projecting from the downwardly disposed portion of the axle for supporting the steering wheel, and means for operating the steering wheel.

JOHN W. HAMM.

Witnesses:
R. H. BENTON,
J. G. HOSEY.